(12) United States Patent
Beuschel et al.

(10) Patent No.: US 11,614,519 B2
(45) Date of Patent: Mar. 28, 2023

(54) ARRANGEMENTS OF LIGHT-RECEIVING ELEMENTS WITH DIFFERENT SENSITIVITIES AND METHODS FOR RECEIVING LIGHT SIGNALS

(71) Applicant: Ibeo Automotive Systems GmbH, Hamburg (DE)

(72) Inventors: Ralf Beuschel, Wangen (DE); Michael Kiehn, Hamburg (DE)

(73) Assignee: IBEO AUTOMOTIVE SYSTEMS GMBH, Hamburg (DE)

( * ) Notice: Subject to any disclaimer, the term of this patent is extended or adjusted under 35 U.S.C. 154(b) by 298 days.

(21) Appl. No.: 16/954,170

(22) PCT Filed: Nov. 20, 2018

(86) PCT No.: PCT/EP2018/081992
§ 371 (c)(1),
(2) Date: Jun. 15, 2020

(87) PCT Pub. No.: WO2019/115185
PCT Pub. Date: Jun. 20, 2019

(65) Prior Publication Data
US 2021/0156975 A1 May 27, 2021

(30) Foreign Application Priority Data
Dec. 15, 2017 (DE) .......................... 102017222972.1

(51) Int. Cl.
*G01S 7/481* (2006.01)
*G01S 7/4863* (2020.01)
(Continued)

(52) U.S. Cl.
CPC ............ *G01S 7/4816* (2013.01); *G01S 7/481* (2013.01); *G01S 7/486* (2013.01); *G01S 7/4863* (2013.01);
(Continued)

(58) Field of Classification Search
CPC ...... G01S 7/4863; G01S 7/4816; G01S 17/10; G01S 17/931; G01S 7/481; G01S 7/486;
(Continued)

(56) References Cited

U.S. PATENT DOCUMENTS 4,322,832 A 3/1982 Sartorius
9,784,835 B1 10/2017 Droz
(Continued)

FOREIGN PATENT DOCUMENTS

DE 2923963 11/1980
DE 10130763 1/2003
(Continued)

OTHER PUBLICATIONS

Office Action issued in Japanese Patent Application No. JPO 2020-552106 mailed from the Japan Patent Office dated Nov. 24, 2021.
(Continued)

*Primary Examiner* — Jennifer D Bennett
(74) *Attorney, Agent, or Firm* — Fitch, Even, Tabin & Flannery LLP

(57) ABSTRACT

A receiving arrangement for receiving light signals and a method for receiving light signals are proposed, wherein a light receiver is provided, which serves for receiving the light signals and converting them into electrical signals. Furthermore, an evaluation circuit is provided, which, depending on the electrical signals and a start signal for the emission of the light signals, determines a distance between the receiving arrangement and an object at which the light signals are reflected. A characterizing feature is that the light receiver has a first group of light-receiving elements, which has a higher sensitivity for receiving the light signals than at
(Continued)

least one further group of light-receiving elements, wherein the first and the further groups are ready for reception at different times.

7 Claims, 3 Drawing Sheets

(51) Int. Cl.
  *G01S 7/486* (2020.01)
  *G01S 17/931* (2020.01)
  *G01S 17/10* (2020.01)
(52) U.S. Cl.
  CPC .............. *G01S 7/4868* (2013.01); *G01S 17/10* (2013.01); *G01S 17/931* (2020.01)
(58) Field of Classification Search
  CPC ........ G01S 7/4868; G01S 7/489; G01S 17/08; G01S 17/93
  See application file for complete search history.

(56) References Cited

U.S. PATENT DOCUMENTS

| | | | |
|---|---|---|---|
| 2004/0233942 | A1 | 11/2004 | Schlueter |
| 2007/0121095 | A1 | 5/2007 | Lewis |
| 2007/0182949 | A1* | 8/2007 | Niclass ............... G01S 7/491 356/3 |
| 2009/0009747 | A1* | 1/2009 | Wolf ................. G01S 17/08 356/4.01 |
| 2012/0205522 | A1 | 8/2012 | Richardson |
| 2015/0028190 | A1 | 1/2015 | Shin |
| 2015/0124137 | A1 | 5/2015 | Sato |
| 2015/0285625 | A1 | 10/2015 | Deane |
| 2016/0209498 | A1 | 7/2016 | Kanter |
| 2016/0266253 | A1 | 9/2016 | Kubota |
| 2016/0284743 | A1 | 9/2016 | Mellot |
| 2017/0176575 | A1 | 6/2017 | Smits |
| 2017/0184704 | A1 | 6/2017 | Yang |
| 2017/0187721 | A1 | 6/2017 | Raynor |
| 2018/0113200 | A1 | 4/2018 | Steinberg |
| 2018/0324416 | A1 | 11/2018 | Kim |

FOREIGN PATENT DOCUMENTS

| | | | |
|---|---|---|---|
| DE | 102006013290 | | 9/2007 |
| DE | 102008005129 | | 5/2009 |
| DE | 102009029372 | | 3/2011 |
| DE | 102011005740 | | 9/2012 |
| DE | 102014207599 | | 10/2015 |
| DE | 102014207599 A1 * | | 10/2015 ............ G01J 1/0228 |
| DE | 102015106635 | | 11/2016 |
| DE | 102017121346 | | 3/2018 |
| DE | 102017222974 | | 6/2019 |
| DE | 102017222972 | | 7/2019 |
| JP | 2595354 | | 4/1997 |
| JP | 2004157044 | | 6/2004 |
| JP | 2011095027 | | 5/2011 |
| JP | 2012242218 | | 12/2012 |
| JP | 2017003391 | | 1/2017 |
| JP | 2018025449 | | 2/2018 |
| KR | 1020160142839 | | 12/2016 |
| WO | 2017081294 | | 5/2017 |
| WO | 2018172115 | | 9/2018 |
| WO | 2019115184 | | 6/2019 |
| WO | 2019115185 | | 6/2019 |

OTHER PUBLICATIONS

English Translation of the International Search Report for PCT/EP2018/081990 issued by the European Patent Office dated Feb. 11, 2019.
Beuschel; U.S. Appl. No. 16/954,135, filed Jun. 15, 2020.
English Translation of the International Search Report for PCT/EP2018/081992 issued by the European Patent Office dated Feb. 14, 2019.
English Translation of International Search Report for International Application No. PCT/EP2019/058394 mailed by the European Patent Office dated Jul. 1, 2019.
English Translation of the International Search Report for PCT/EP2019/058392 mailed by the European Patent Office dated Jul. 4, 2019; 2 pages.
Office Action issued in Japanese Patent Application No. JPO 2020-555232 mailed from the Japan Patent Office dated Nov. 24, 2021.
USPTO: Non-Final Office Action issued in U.S. Appl. No. 16/954,135 dated Jul. 13, 2022.

* cited by examiner

ARRANGEMENTS OF LIGHT-RECEIVING ELEMENTS WITH DIFFERENT SENSITIVITIES AND METHODS FOR RECEIVING LIGHT SIGNALS

CROSS-REFERENCE TO RELATED APPLICATIONS

This patent application is the national phase of PCT Application No. PCT/EP2018/081992, filed Nov. 20, 2018, which claims the benefit of German Patent Application No. 10 2017 222 972.1, filed Dec. 15, 2017, both of which are incorporated in their entirety herein by reference.

BACKGROUND OF THE INVENTION

1. Field of the Invention

The invention relates to a receiving arrangement for receiving light signals and a method for receiving light signals of the type indicated in the independent claims.

2. Discussion of the Related Art

A system and a method for measuring the phase of a modulated optical signal is known from U.S. 2004/0233942 A1. In this system, so-called single-photon detectors SPDs are used to receive. It is further indicated that this type of detector, to which SPADs (single-photon avalanche diodes) belong, has a so-called dead time.

SUMMARY OF THE INVENTION

In contrast, the receiving arrangement for receiving light signals in accordance with the invention and the method for receiving light signals in accordance with the invention with the features of the independent claims have the advantage that, through the use of different groups of light-receiving elements in the light receiver, which respectively have a different sensitivity for the reception of the light signals, a ready-to-receive state is achieved in the dead time, in particular during back-reflection. Back-reflection means that the emitted light signals blind their own receiving arrangement.

The monitoring of the near range, for example when using a LiDAR system, is necessary for various reasons: the transmission behaviour of for example a glass panel arranged above the transmitting and receiving arrangement, must be monitored for the self-diagnosis of the sensor. Objects arranged directly in front of a LiDAR system must be monitorable or detectable up to a distance of a few centimetres, since such objects must not disappear in the near range. The light power emitted may have to be reduced when a person or some other object is arranged very close to the LiDAR sensor. It is also problematic that a light pulse reflected on a front panel can activate the light-receiving elements which are configured, for example, as SPAD cells. After such an activation, the, for example, SPAD cells have this so-called dead time. This can be 10-20 nanoseconds, only after which a fresh detection of light signals is again possible. A measurement is also not possible during the transmission of the light signals, the pulse width then being, for example, 5 nanoseconds. Direct optical crosstalk can arise between transmitter and receiver by means of a front panel. The system is designed for large ranges of several hundreds of metres and thus uses high-energy light signals and very sensitive receiving elements. A low back-scattering of the front panel of e.g. 1% is thus sufficient for the complete incapacitation of the receiver. With typical SPAD receiving cells, a dead time of 10 to 20 nanoseconds results, which corresponds to a near range of 1.5 to 3 metres in which no object would be able to be detected. Besides the LiDAR system, the invention can also be used for related systems.

The receiving arrangement according to the invention can be, for example, configured as an assembly that is installed as such, for example, in a vehicle for environment detection. However, it is also possible for the receiving arrangement to be configured in a distributed manner, i.e. consisting of different assemblies or components. At least parts of the receiving arrangement or also the entire arrangement can be configured as integrated circuits or in particular as a single circuit.

The light signals are preferably periodic light signals, which are thus emitted with a given repetition frequency. For example, laser pulses with a period in the microsecond range are transmitted, the pulse width of the laser pulse being, for example, a few nanoseconds. These light signals are preferably generated with semiconductor lasers, for example so-called VCSELs (vertical-cavity surface-emitting lasers).

The light receiver is a device having a plurality of light-receiving elements. There are at least two groups of such light-receiving elements in accordance with the invention. A first group of light-receiving elements exhibits a higher sensitivity than at least one other group of such light-receiving elements. The first group is used for the far range and the at least one other group is used for the near range. It was recognized in accordance with the invention that, due to the occurrence of the so-called dead time of, for example, SPADs, the near range can also be reliably detected by the deactivation of the SPADs with a higher sensitivity during, for example, the laser emission phase and at the same time the activation of the SPADs with a lower sensitivity. By near range, distances of a few centimetres up to 3 metres are meant.

The evaluation circuit can be a combination of software and hardware components or also solely software components or solely hardware components. This evaluation circuit can consist of a plurality of components or also solely of a single component. The light-receiving elements convert the light signals into electrical signals; these electrical signals are used to determine the distance between the receiving arrangement and an object on which the light signals were reflected. A start signal, which marks the point in time of the light emission and starts the measurement, is additionally provided for the distance determination. This start signal can be electrically or optically decoupled from the generation of light pulses.

The object can be another vehicle, a stationary object such as a tree or people or other things. The distance determination is typically performed up to a distance of 300 metres within the range of the vehicle. The so-called time-of-flight principle is used as the measurement principle. In order to achieve the 300 metres here, a time period of 2 microseconds is necessary.

The light receiver has a group of light-receiving elements, i.e. there are at least 2 light-receiving elements per light receiver. Typically, however, the number is considerably higher so that there is an entire host of, for example, photodiodes—a so-called array which can preferably be activated column-wise and in such a manner that, when a column is activated in the laser array, the corresponding column in the light receiver array is also activated. That is to say that, if the first column in the laser array is activated, then the first column in the light receiver array is also activated.

The sensitivity of the light-receiving elements for receiving light signals denotes the nature of the relationship between irradiated light and the output signal. In the case of analogue photodetectors, a low sensitivity means that more light is required to produce the same photocurrent than with such light-receiving elements with a higher sensitivity. In the case of SPAD photodetectors, photocells with a lower sensitivity exhibit a lower probability of detecting a photon than receiver cells with a high sensitivity.

As the first and the second group of the light-receiving elements are ready to receive at different times, it is established that the groups never receive light simultaneously. That is to say that there is a disjunct activation of the ready-to-receive state of the two groups. Ready to receive means that the light-receiving element can convert received light signals into electrical signals so that they can be evaluated accordingly.

By means of the measures specified in the dependent claims, further advantageous embodiments of the receiving arrangement according to the invention and of the method for receiving light signals according to the invention are possible.

It is advantageous for the other group to be ready to receive depending on the start signal of a transmitter circuit for transmitting the light signals. That is to say that the receiving arrangement receives from a transmitter circuit, which typically emits the light signal by means of a semiconductor laser array, an electrical and/or optical start signal which is used to trigger the ready-to-receive state of the further group. This means in particular that this further group is ready to receive when the start signal indicates that light signals are being transmitted. The first group is then not ready to receive during this time.

The lower sensitivity of the further group is advantageously achieved by means of a mask, by providing in front of each light-receiving element of this further group an opening that is reduced in comparison with the opening of the mask before the light-receiving elements of the first group. By means of such a reduced opening or aperture, the light energy impinging the light-receiving element is reduced. This is then accompanied by a reduction in sensitivity. Such an opening is called an aperture in optics.

It is provided in an advantageous embodiment that the masking differs, i.e. the openings have varying sizes. The openings can, for example, be configured in a ratio of 1:5, 1:20 or 1:100 in relation to the openings of the first group. The reason for this is that spatial resolution is not necessary in the near range, while the dynamics are critical, as there is a high signal energy in this near range. If objects are very close to the receiving arrangement, a large quantity of light is reflected and is not dampened by the greater distance, i.e. there is less scattering.

It is additionally advantageous for the light-receiving elements of the first group to be arranged directly at the position of the received light signals with an infinite object distance. The light-receiving elements of the further group are arranged so as to be offset in relation to the light-receiving elements of the first group so that the light-receiving elements of the further group lie outside the position of the received light signals with an infinite object distance. This has the advantage that the light signals and the light-receiving elements do not lie in the focal point in the near range. In addition, it is also not necessary for there to be a correct spatial overlap of the receiving arrangement and the transmitter device in this near range.

It is further advantageous for the light-receiving elements to have single-photon avalanche diodes. These SPADs are provided with a high reverse voltage so that one photon can already be sufficient to trigger the avalanche effect in these diodes. In LiDAR applications, it is possible for different diodes of this type to be combined into macrodiodes, for example, by ORing the output signals together or adding them together. Such single-photon avalanche diodes are typically made of silicon. Compound semiconductors, however, are also possible. The mode of operation of such diodes is also called Geiger mode.

It is further advantageous for the electrical signals of the first and of the further group to be connected by at least one OR logic gate. By means of such a connection, it is possible to keep the signal processing simple, as the same signal processing configuration can be used for different groups of diodes or individual diodes.

It is further advantageous for the mask to be metallic. This mask made of metal or at least partially made of metal can be vapour-deposited, for example on a glass plate or also directly on the semiconductor and then removed again by photoresist structuring and corresponding etching processes. An electrolytical application of such a metallization is also possible.

BRIEF DESCRIPTION OF THE DRAWINGS

Embodiments of the invention are depicted in the drawings and described in greater detail in the following description.

The figures show.

DETAILED DESCRIPTION

Figure 1:
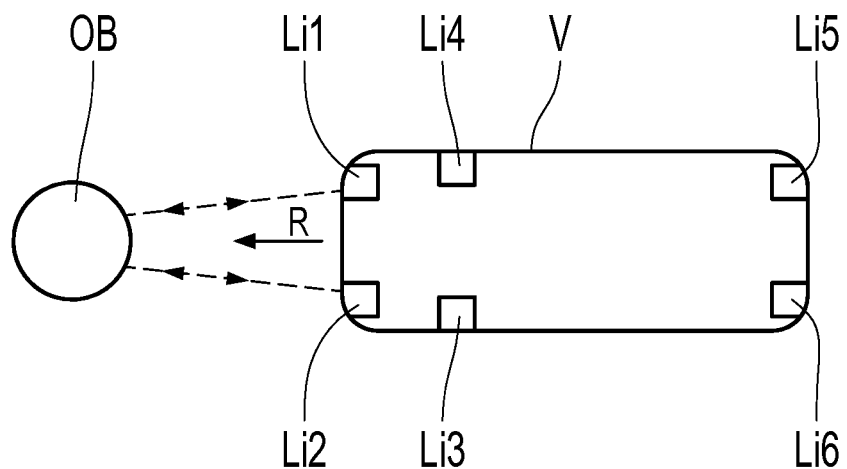
FIG. 1 a schematic arrangement of LiDAR modules in a vehicle.

FIG. 1 shows a vehicle V moving in the direction R. The vehicle V has the LiDAR modules Li1 to Li6. A LiDAR module is composed of a transmitter device for transmitting light signals and the receiving arrangement in accordance with the invention for receiving the subsequently reflected light signals. These LiDAR modules detect the environment of the vehicle V. More or fewer LiDAR modules can be used and also at other points of the vehicle V. The object OB is thus detected by the LiDAR module Li1. By means of a distance determination and corresponding characterization based on the motion parameters of the object, it is possible to infer a potential collision and to influence corresponding movements of the vehicle V in order to avoid a collision with the object OB.

The LiDAR modules Li1 to Li6 have a receiver arrangement in accordance with the invention and a transmitter device, which, as described above, transmits the laser pulses with a laser array, in order to then receive the laser pulses reflected on the object OB with a SPAD array and then evaluate the same accordingly with the time-correlated photon count in order to determine the distance between the object OB and the vehicle V. For this purpose, the time-of-flight method is used.

The object detection in the present case can be carried out, for example, using the measurement principle TCSPC (time-correlated single photon counting). The measurement method of time-correlated single photon counting is a technique for measuring rapidly changing light intensities. In the process, a measurement is repeated multiple times and the individual photons that are time-correlated in relation to the excitation pulse are sorted according to their measured time in a so-called TCSPC histogram. The latter typically possesses a time channel resolution or class width of 0.1 to 1 ns and expresses the timeline of the back-scattered light of a laser pulse. This enables a very precise time measurement of the laser pulse. For example, an object is hit by a transmitter device with several photons that are then received by the receiver arrangement. By means of the frequent repetition of this photon determination, it is possible to determine the light pulse with respect to its flight time and amplitude with precision. After the measurement has been completed, the times of the local maximum values are identified in the histogram. The temporal position of the maximum values allows the measurement of the distance to one or more objects.

Figure 2:
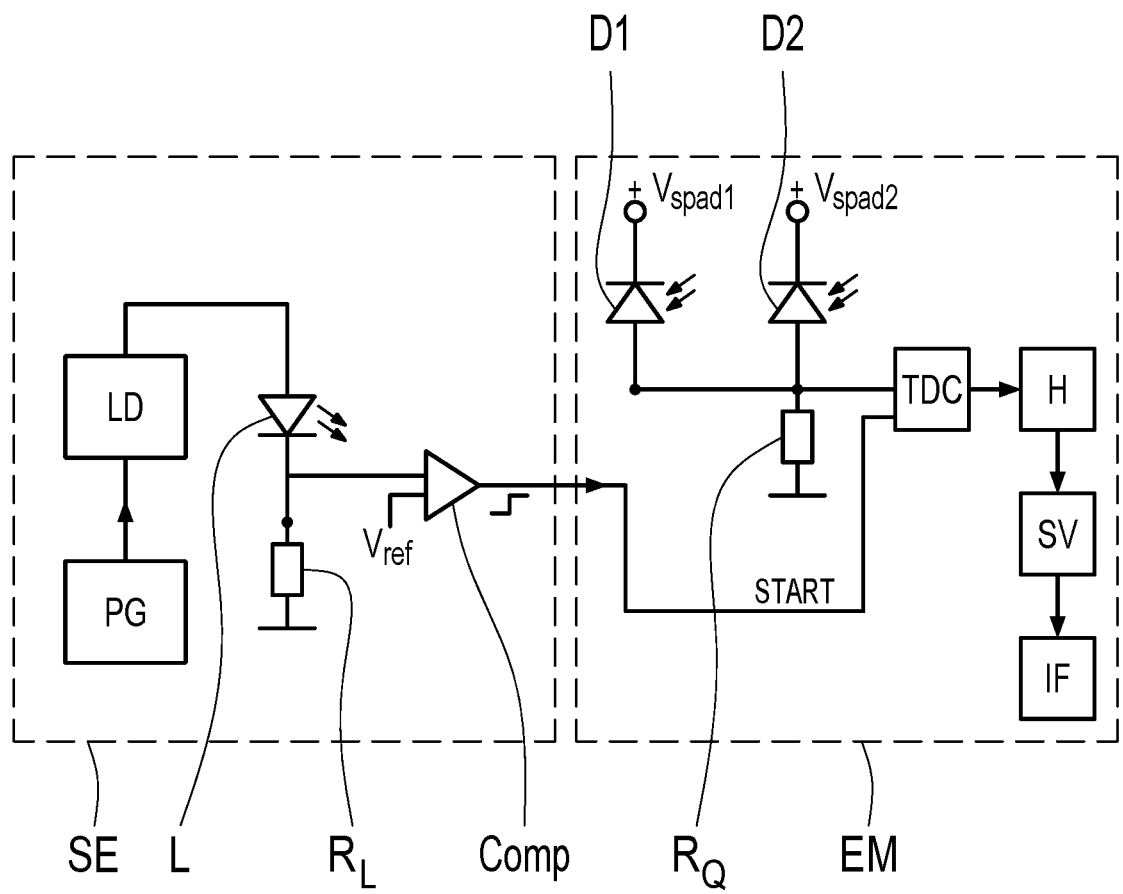
FIG. 2 a block circuit diagram of the receiving arrangement in accordance with the invention with a connected transmitter device, FIG. 3 a first configuration of the two groups of light-receiving elements, FIG. 4 a further configuration of the two groups of light-receiving elements and FIG. 5 a flow diagram of the method according to the invention.

FIG. 2 shows in a block circuit diagram the receiving arrangement EM in accordance with the invention, which is connected to a transmitter circuit SE. The transmitter circuit SE has a pulse generator PG, which controls a laser driver LD. As illustrated above, it is advantageous if the light signals are emitted in pulses with a pulse width of the pulse packet of 5 nanoseconds with a period of 2 microseconds. A pulse generator that can be built using hardware technology and/or software engineering is thus advantageous.

FIG. 2 illustratively depicts a laser driver which supplies an electrical start signal for the time-correlated photon measurement. The start signal can, however, also be supplied in some other manner. For example, it is also possible to use the signal of the pulse generator directly when the delay of the laser driver is constant.

The laser driver LD does this by supplying the laser diodes L in the semiconductor laser array with a corresponding pulse current. The laser diodes L are connected to ground via a resistor RL, which represents a shunt resistor. The output signal is fed, between the laser diodes L and the shunt resistor RL, to a comparator Comp where the output signal is compared with a reference voltage Vref. The start signal START is used in the receiving arrangement to measure the times of the photon events in relation to the light emission by means of a time-to-digital converter (TDC) and to accumulate these in a histogram H.

The individual receiver diodes are then activated as a function this signal. This start signal Start is fed to a time-to-digital converter TDC of the receiving arrangement EM in order to trigger the processing of the signal. This start signal is, however, still, which is not illustrated here, used during the emission of the laser pulses to switch the further group of SPADs, designated by the symbol D2 here, to a ready-to-receive state. The diodes D1 are not switched to a ready-to-receive state during this period. They are thus blocked. Only the diodes D2 can convert light signals into electrical signals during this period. This further group of the SPADs D2 exhibits a lower sensitivity for the reception of light signals than the first group of SPADs D1. For the purposes of illustration, the two SPADs D1 and D2 are connected here to the time-to-digital converter TDC via a simple connection representing an OR connection.

They are further connected to a so-called quench resistor RQ, which in turn is connected to ground. The so-called quenching occurs via the quench resistor RQ: the avalanche effect is slowed and finally stopped, in the present case by means of the resistor RQ. This also occurs in a time that is much smaller than 1 ns. This quenching is necessary in order to avoid the self-destruction of the photodiode. The quenching with a resistor is called passive quenching. After the avalanche effect has been stopped, the SPAD cell is recharged via the resistor to the higher bias voltage Vspad1 and Vspad2, respectively.

The diodes D1 are switched to a ready-to-receive state before, with or after the transmission pulse and the diodes D2 are then placed in the blocked mode and are thus no longer ready to receive. This not-ready-to-receive state is achieved by placing the voltage SPAD1 and Vspad2, respectively, briefly beneath the breakdown voltage.

This control of the voltages is brought about by a control component not illustrated here or control software via corresponding hardware. If light signals are converted into electrical signals by one of the groups of light-receiving elements during these disjunct time periods, a so-called event signal exists that goes into the time-to-digital converter TDC. The clock signal for the time-to-digital converter TDC is also set in accordance with the start signal. The time-to-digital converter TDC can also determine with the help of the start signal what time the event signal should be assigned to, i.e. how long the photons needed in order to get from the transmitter device SE to the receiving device EM. The time for this event is then archived in a histogram H. This is repeated frequently. If the interval or period of time has passed, the distance that is determined by the archived time with the strongest signal, i.e. the largest photon count, is identified by means of a search for maxima in the histogram. The distance is then determined therefrom in the signal processing SV and relayed via the interface component IF. Corresponding driving functions can be derived therefrom. A so-called time-correlated photon count is thus realized.

Figure 3:
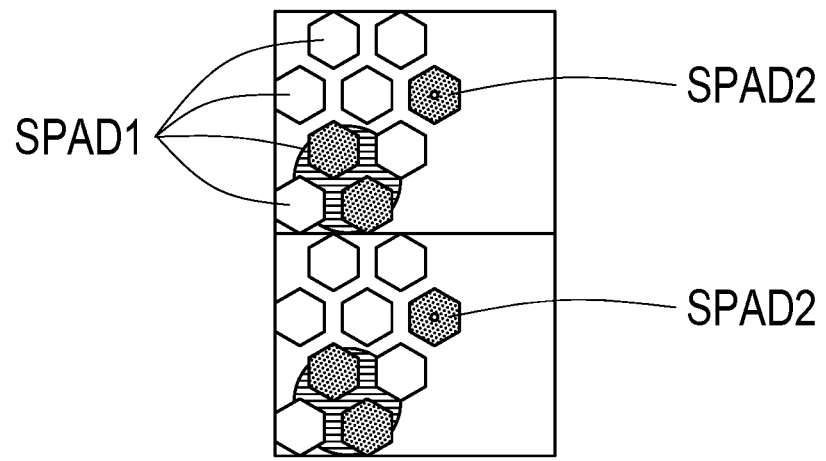

FIG. 3 shows a first configuration of the two groups of light-receiving elements. The first group is designated by SPAD1 and the second group by SPAD2, which have an aperture in the middle. Depicted by the circle is also a so-called bright spot, as some SPADs, which are coloured in, then also convert light signals into electrical signals. The grey SPAD1 diodes are not activated by the light signal. It is characteristic that the SPAD2 respectively have the same aperture.

Figure 4:
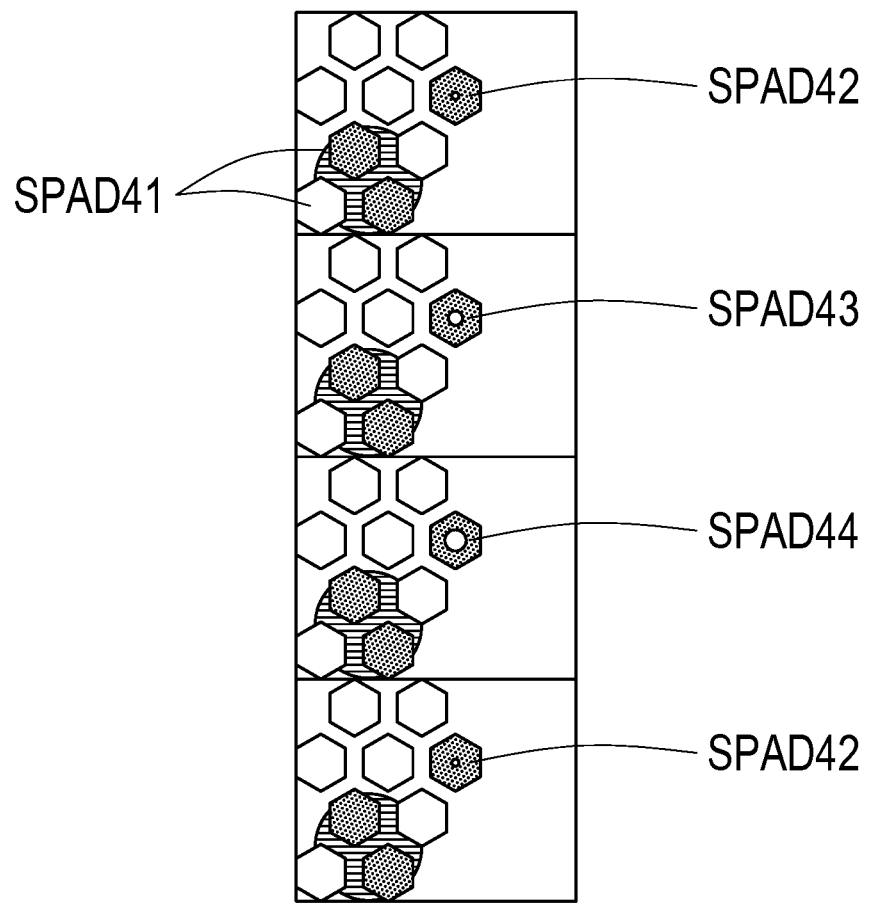

A variant is shown in FIG. 4. The first group of SPADs is designated here by SPAD41, while once again the ones coloured in are the activated SPADs. The further group of SPADs is designated by means of the hexagons with apertures of different sizes, which are designated by SPAD42, 43, 44. As indicated above, these apertures have ratios of, for example, 1:5, 1:20 and 1:100. For each aperture size and accompanying sensitivity level, a reduced spatial resolution results. The reason for this is that vertical resolution is not necessary in the near range, while the dynamic range is critical because of the high signal energy.

Figure 5:
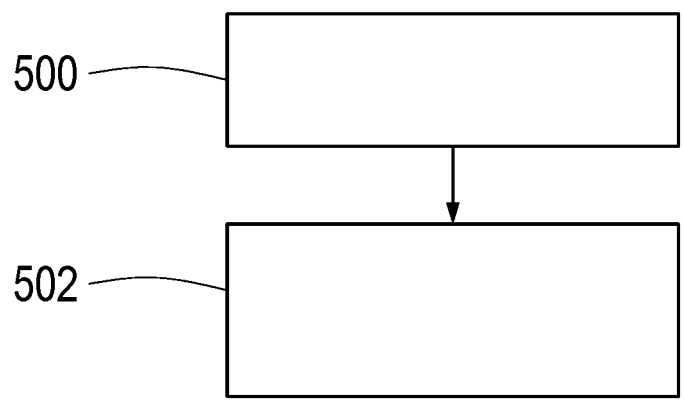

FIG. 5 shows a flow diagram of the method according to the invention. In the method step 500, the light signals are received and converted. In the method step 502, a distance determination is carried out. Two groups of SPADs are respectively illustrated from above, respectively switched to a ready-to-receive state. During the emission of light signals, those SPADs are switched to a ready-to-receive state that have a lower sensitivity with respect to the reception of light signals. Otherwise, the SPADs with a higher sensitivity are activated. It is thus achieved that a near-range detection, which is necessary, for example, for the operation of a motor vehicle, is also rendered possible.

The invention claimed is:

1. A receiving arrangement for receiving light signals with:
   a light receiver for receiving light signals and for converting the light signals into electrical signals; and
   an evaluation circuit, which determines a distance between the receiving arrangement and an object depending on the electrical signals and a start signal for an emission of the light signals, wherein the light receiver has a first group of light-receiving elements which have a higher sensitivity for the reception of light signals than a further group of light-receiving elements, wherein the first and the further group are ready to receive at different points in time,
   wherein the first group is configured for detecting light signals from a far range of a measurement area of the receiving arrangement and the further group is configured for detecting light signals from a near range,
   wherein the light-receiving elements of the first group and the light-receiving elements of the further group are single-photon avalanche diodes (SPAD),
   wherein the first and the further group are ready to receive at different points in time, so that the first and the further group never receive light simultaneously, wherein, while the first group is ready to receive, the further group is in a not-ready-to-receive state which is achieved by placing a voltage of the light-receiving elements of the further group briefly beneath a breakdown voltage,
   wherein, while the further group is ready to receive, the first group is in a not-ready-to-receive state which is achieved by placing a voltage of the light-receiving elements of the first group briefly beneath the breakdown voltage,
   wherein the first and the further group are masked by means of a mask providing an opening in front of each light-receiving element of the groups and wherein the openings of the further group are smaller than those of the first group.

2. The receiving arrangement according to claim 1, wherein the further group is ready to receive depending on the start signal.

3. The receiving arrangement according to claim 2, wherein the start signal indicates the emission of the light signals so that the further group is ready to receive at least during the emission of the light signals.

4. The receiving arrangement according to claim 1, wherein the light-receiving elements of the further group are arranged so as to be offset in relation to the light-receiving elements of the first group so that, with an infinite object distance, the light-receiving elements of the further group lie outside the position of the received light signals.

5. The receiving arrangement according to claim 1, wherein the electrical signals of the first and of the further group are connected at least by an OR logic link.

6. The receiving arrangement according to claim 1, wherein the mask is metallic.

7. A method for receiving light signals with the following method steps:
   receiving the light signals and converting the light signals into electrical signals with a light receiver; and
   determining a distance between the light receiver and an object depending on the electrical signals and a start signal for an emission of the light signals, wherein a first group of light-receiving elements and a further group of light-receiving elements are ready to receive at different times, so that the first and the further group never receive light simultaneously, wherein the light-receiving elements of the first group have a higher sensitivity for the reception of the light signals than the reception elements of the further group,
   wherein, while the first group is ready to receive, the further group is in a not-ready-to-receive state which is achieved by placing a voltage of the light-receiving elements of the further group briefly beneath a breakdown voltage,
   wherein, while the further group is ready to receive, the first group is in a not-ready-to-receive state which is achieved by placing a voltage of the light-receiving elements of the first group briefly beneath the breakdown voltage,
   wherein the first group is used for the detecting light signals from a far range of a measurement area of the receiving arrangement and the further group is used for detecting light signals from a near range,
   wherein the light-receiving elements are single-photon avalanche diodes (SPAD),
   wherein the first and the further group are masked by providing an opening in front of each light-receiving element of the groups and wherein the openings of the further group are smaller than those of the first group.

* * * * *